Patented July 3, 1951

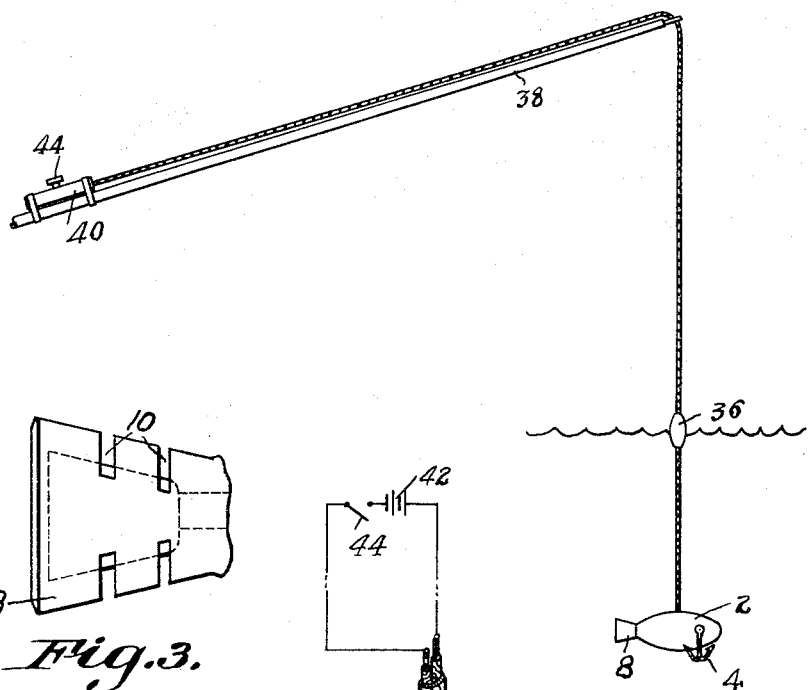
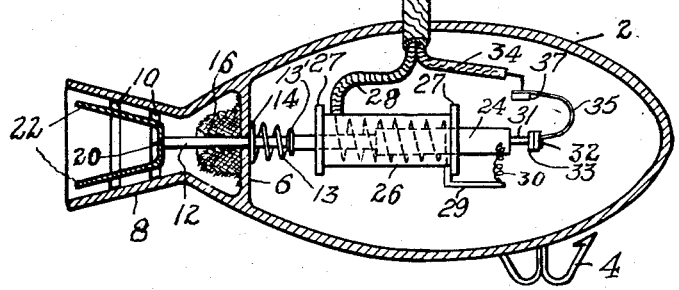

2,559,475

UNITED STATES PATENT OFFICE 2,559,475

FISHING BAIT

Ward F. Sparkman, Huntsville, Ala.

Application May 6, 1946, Serial No. 667,516

1 Claim. (Cl. 43—26.2)

My present invention relates to an improved fishing bait and more particularly to a fishing bait simulating a small fish such as a minnow and including means for imparting a darting motion to the bait.

In carrying out my invention I employ a novel and unique combination of parts wherein an electro-magnet within the hollow shell of the bait acts upon a core or armature to impart lateral movement to an impeller.

In the accompanying drawings I have illustrated one complete example of the physical embodiment of my invention according to the best mode I have thus far devised but it will be understood that various changes and alterations may be made in the exemplified structure within the scope and spirit of the appended claim.

In the drawings:

Figure 1 is an assembled elevational view showing a fishing rod and line carrying the fishing bait of my invention.

Figure 2 is a vertical longitudinal sectional view of the fishing bait.

Figure 3 is an enlarged detail view in top plan of the tail of the fishing bait.

Referring now to the drawings, I have illustrated a fishing bait having a shell 2 elongated and designed to resemble a minnow or other small fish. The shell is fashioned with a side hook 4. Within the hollow shell 2 and rearward thereof I utilize a vertical interior partition 6 and rearward of this interior partition, the shell 2 flares outwardly as at 8. This hollow tail flared outwardly and rearwardly is formed with vertical slots 10 therein permitting movement of water therethrough as will be hereinafter described.

A shaft 12 of non-conducting and non-magnetic material is slidably mounted in the partition 6 and a waterproof and watertight flexible covering 16 is employed to seal the partition opening 14 through which the shaft extends. It will be apparent therefore that the portion of the shell forward of the partition is watertight, the covering 16 preventing water from the tail passing into the forward portion of the shell. This covering is of oiled silk or like material and is secured at one end edge to the shaft 12, surrounding the shaft, the other end edge being secured to partition 6 and surrounding opening 14.

Within the flared tail I utilize an impeller for the bait comprising a base portion 20 attached to the end of the shaft 12 and formed with flaring walls 22 substantially parallel with and spaced from the respective inner surfaces of the flaring tail 8.

To the opposite end of the shaft 12 and interior of the sealed portion of the shell 2, I secure one end of a core or armature 24 reciprocable within the electro-magnet 26. The electro-magnet 26 is supported immovably by the arms 27 of a bracket affixed to the wall of shell 2. Wire 28 leads from one end of the winding coil of the magnet while a conductive arm 29 extends from the other end of the winding. To this arm is connected a very flexible wire 30 that is secured to the outer end of core 24, the core thus serving as part of the circuit. A conductive head 31 is rigid with the outer end of the core and is provided with one contact 33 of a circuit breaker, the other contact being designated 32 and being carried by one end of a conductive spring 35. Spring 35 normally exerts a light pressure toward the core. The other end of the spring 35 is fixed to a nonconductive pin 37 that projects from the wall of the shell 2. Secured to the spring 35 is a wire 34, and this leads to a switch and current source, to be described, completing the circuit with wire 28.

The two wires 28 and 34 are joined and form a flexible fishing line on which I have shown a float 36 and the flexible line depends from the fishing rod 38 on which is mounted a casing 40 for the batteries 42, and a switch 44 is mounted on the casing.

Located immediately in front of the partition 6 is a coiled spring 13 through which the shaft 12 extends. At one end the spring 13 abuts against the partition 6, while at the other end the spring abuts against a collar 13' fixed to the shaft 12.

In operation, the bait is lowered into the water and the switch 44 is closed. The current from the batteries energizes the electro-magnet attracting the armature to which is attached the shaft 12. As the shaft moves rearwardly through the opening 14, the impeller on the end of the shaft moves rearwardly with a jerk. This movement of the impeller moves the bait forward simulating the darting motion of a minnow. It should be noted that as the armature moves rearwardly, spring 35 will permit the armature to move a short part of its full travel without the circuit being broken. However, on continued travel of the armature, in a rearward direction, the contact 33 moves away from the contact 32, thus breaking the circuit. Spring 13, meanwhile, has been compressed, and since the coil is now deenergized by breaking of the circuit, spring 13 will return the armature to its illustrated normal position.

However as the armature returns, the circuit is again closed by the contacts coming together, and the cycle is repeated so long as the switch 44 remains closed. Thus the bait will intermittently dart forward simulating the movement of a minnow and will attract fish which while seeking to devour the bait will be impaled on the hook 4.

As the impeller moves outwardly from the flaring tail, water is permitted to enter the tail through the arcuate slots 10 in the wall of the tail. The walls of the impeller are designed to move close to the wall of the tail so that a maximum movement will result. As the circuit is broken and the impeller is returned by the spring, the impeller enters the tail and pushes the water therein out through the slots. The impeller 22, as will be seen from Fig. 2, is of approximate U shape having open sides and rearwardly diverging top and bottom walls. The open sides of the impeller are exposed to the slots 10 formed in the side walls of the tail. By reason of this construction, the impeller is designed to provide a minimum of resistance to water pressure on its return movement, and to provide a maximum pressure on its outward movement, and thus, uni-directional motion in a forward direction, simulating the periodic forward darting of a live minnow, is given to the bait.

By the utilization of my invention, a life-like motion of the bait will result from the initial closing of the switch, and the intermittent movement of the impeller will follow automatically.

Having thus fully described my invention what I claim as new and desire to secure by Letters Patent is:

A fishing bait comprising a hollow shell, a tail integral with said shell at the rear end thereof and formed to a rearwardly and outwardly flared frusto-conical shape, said tail having a plurality of vertical slots disposed on each side thereof and spaced longitudinaly of the tail, an electro-magnet mounted in and extended longitudinally of said shell, an armature reciprocable within the electro-magnet and movable in one direction on energizing of the electro-magnet, a spring for return movement of the armature on de-energizing of the electro-magnet, a shaft rigid with the armature and projecting into said tail, an impeller rigid with the shaft and disposed entirely within said tail in one extreme position of the shaft, said impeller being of approximate U-shape and having open sides and rearwardly diverging top and bottom walls, and means for intermittently making and breaking a circuit to the electro-magnet, to reciprocate the shaft and cause the impeller to move into and out of the flared tail, said slots comprising openings through which water enters and leaves the flared tail responsive to movement of the impeller out of and into the flared tail.

WARD F. SPARKMAN.

REFERENCES CITED

The following references are of record in the file of this patent:

UNITED STATES PATENTS

| Number | Name | Date |
| --- | --- | --- |
| 726,020 | Bryan | Apr. 21, 1903 |
| 1,446,816 | Taylor | Feb. 27, 1923 |
| 1,906,791 | Grossmann | May 2, 1933 |
| 2,286,176 | Boisselier | June 9, 1942 |

FOREIGN PATENTS

| Number | Country | Date |
| --- | --- | --- |
| 3,900 | France | Apr. 19, 1905 |
| (Addition to 336,406) | | |